(12) United States Patent
Hong et al.

(10) Patent No.: US 8,291,276 B2
(45) Date of Patent: Oct. 16, 2012

(54) INTERACTION METHOD BETWEEN ARQ AND HARQ FOR SYSTEMS WITH LONG ROUNDTRIP DELAY

(75) Inventors: Tae Chul Hong, Daejeon (KR); Kunseok Kang, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 462 days.

(21) Appl. No.: 12/558,793

(22) Filed: Sep. 14, 2009

(65) Prior Publication Data

US 2010/0138713 A1  Jun. 3, 2010

(30) Foreign Application Priority Data

Dec. 3, 2008  (KR) ........................ 10-2008-0121805

(51) Int. Cl.
*G08C 25/02* (2006.01)
*H04L 1/08* (2006.01)
(52) U.S. Cl. ...................................................... 714/748
(58) Field of Classification Search .................. 714/748, 714/776, 749, 750, 752, 799, 18
See application file for complete search history.

(56) References Cited

U.S. PATENT DOCUMENTS

| | | | | |
|---|---|---|---|---|
| 4,970,714 | A * | 11/1990 | Chen et al. | 370/216 |
| 7,783,949 | B2 * | 8/2010 | Lohr et al. | 714/751 |
| 2005/0243831 | A1 * | 11/2005 | Zhang et al. | 370/394 |
| 2007/0280191 | A1 * | 12/2007 | Jiang | 370/345 |
| 2008/0043619 | A1 | 2/2008 | Sammour et al. | |
| 2008/0101285 | A1 | 5/2008 | Venkatachalam et al. | |
| 2008/0301516 | A1 * | 12/2008 | Han et al. | 714/748 |
| 2009/0235139 | A1 * | 9/2009 | Park et al. | 714/750 |
| 2009/0327830 | A1 * | 12/2009 | Lee et al. | 714/749 |
| 2010/0281325 | A1 * | 11/2010 | Lohr et al. | 714/749 |

FOREIGN PATENT DOCUMENTS

| | | |
|---|---|---|
| JP | 2007-36464 | 2/2007 |
| KR | 10-2007-0036731 | 4/2007 |
| KR | 10-2007-0073588 | 7/2007 |
| KR | 10-2007-0081987 | 8/2007 |
| KR | 10-2007-0095774 | 10/2007 |
| KR | 10-2007-0099379 | 10/2007 |
| KR | 10-2007-0102167 | 10/2007 |
| KR | 10-2007-0108300 | 11/2007 |
| KR | 10-2007-0109313 | 11/2007 |
| KR | 10-2008-0053161 | 6/2008 |
| KR | 10-2008-0083714 | 9/2008 |

* cited by examiner

*Primary Examiner* — Phung M Chung
(74) *Attorney, Agent, or Firm* — Staas & Halsey LLP

(57) ABSTRACT

Disclosed is an interaction method between an automatic repeat request (ARQ) and a hybrid automatic repeat request (HARQ) in a system having a long roundtrip delay. A transmission window for the ARQ is operated using inner feedback information from the HARQ, and a waiting window is operated using ARQ status information.

10 Claims, 6 Drawing Sheets

INTERACTION METHOD BETWEEN ARQ AND HARQ FOR SYSTEMS WITH LONG ROUNDTRIP DELAY

CROSS-REFERENCE TO RELATED APPLICATION

This application claims the benefit of Korean Patent Application No. 10-2008-0121805, filed on Dec. 3, 2008, in the Korean Intellectual Property Office, the disclosure of which is incorporated herein by reference.

BACKGROUND

1. Field

Example embodiments relate to an interaction method between an automatic repeat request (ARQ) and a hybrid automatic repeat request (HARQ) in a system with a long roundtrip delay.

2. Description of the Related Art

An HARQ is a combination of forward error correction (FEC) and an ARQ.

The FEC is a technique that helps in receiving correct information by correcting an error occurring in a wireless channel using an error correction mark in a wireless channel.

Also, the ARQ is a method where a receiving end receives a packet by requesting a transmitting end to retransmit a packet, when an error occurs in a channel.

The HARQ is a method that prevents an error by using the error correction mark, and retransmits the packet via an automatic repeat request when the error is not corrected by the error correction mark.

In general, the HARQ is performed in a lower layer of a layer where a conventional ARQ is performed, and thus, error is corrected by the ARQ when the error is not corrected by the HARQ.

According to a conventional land mobile communication system, a network controller, such as a base station controller (BCS), a radio network controller (RNC), and the like, separately exists from a base station, and thus interaction between the HARQ and the ARQ may be ineffective.

However, according to a long term evolution (LTE) standard proposed in a 3rd generation partnership project (3GPP), the base station is defined to perform even a network controlling function, and thus a technique of interacting between the HARQ and the ARQ is applicable.

SUMMARY

Example embodiments may provide a method of operating a transmission window for automatic repeat request (ARQ) using inner feedback information from hybrid automatic repeat request (HARQ), and operating a waiting window using an ARQ status information, thereby solving a problem of the transmission window that cannot promptly move due to a long roundtrip delay.

According to example embodiments, there may be provided a method of interacting between an ARQ and an HARQ in a system with a long roundtrip delay, the method including determining, by a first layer unit, whether a packet transmission of a packet succeeds or fails, using first feedback information received in response to the packet transmission, transferring, by a second layer unit, a packet from a transmission window to a waiting window, when the first layer unit determines that the packet transmission of the packet succeeds, transferring, by the second layer unit, the packet from the transmission window to a retransmission window to retransmit the packet, when the first layer unit determines that the packet transmission of the packet fails, and receiving, by the second layer unit, second feedback information including the packet, and determining a process of the packet based on the second feedback information.

In this instance, the transferring of the packet when the first layer unit determines that the packet transmission succeeds may further include adjusting, by the second layer unit, a size of the transmission window using the feedback information of the first layer unit, to perform an additional transmission.

In this instance, the adjusting of the size of the transmission window may include increasing a maximum send state variable relating to the transmission window of the second layer unit to be the size of the packet, when a sequence number of the packet is not identical to a sequence number of the packet to be currently received, reordering the waiting window after determining reordering of the waiting window is required, when the sequence number of the packet is identical to the sequence number of the packet to be received, and restoring the maximum send state variable to a default value, when the restoring is successfully completed, and increasing the maximum send state variable by the size of the packet, when the reordering is not successfully completed.

In this instance, method of interacting between an ARQ and an HARQ may further include retransmitting the packet, when an error where failure of the packet transmission (NACK) is recognized as success of the packet transmission (ACK), occurs.

In this instance, the retransmitting of the packet includes receiving the first feedback information including information relating to retransmission of the packet or the second feedback information including information relating to retransmission of the packet, when the error where the NACK is recognized as the ACK, occurs, transferring, by the waiting window, the packet to the retransmission window based on the first feedback and the second feedback, and retransmitting, by the retransmission window, the packet.

In this instance, the first layer unit is a media access control (MAC) layer that performs hybrid automatic repeat request (HARQ).

In this instance, the second layer unit is a radio link control (RLC) layer that performs automatic repeat request (ARQ).

In this instance, the first feedback information is feedback information relating to HARQ.

In this instance, the second feedback information is feedback information relating to ARQ.

In this instance, the receiving of the second feedback information and the determining of the process of the packet may include deleting the packet, when the packet transmission succeeds as a result of analysis of the second feedback information, not performing retransmission of the packet when the first layer unit is performing retransmission of the packet, when the packet transmission fails and when the packet exists in the transmission window as a result of the second feedback information, and performing retransmission of the packet when the first layer unit is not performing retransmission of the packet, when the packet transmission fails, and when the packet exists in the waiting window as a result of the second feedback information.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
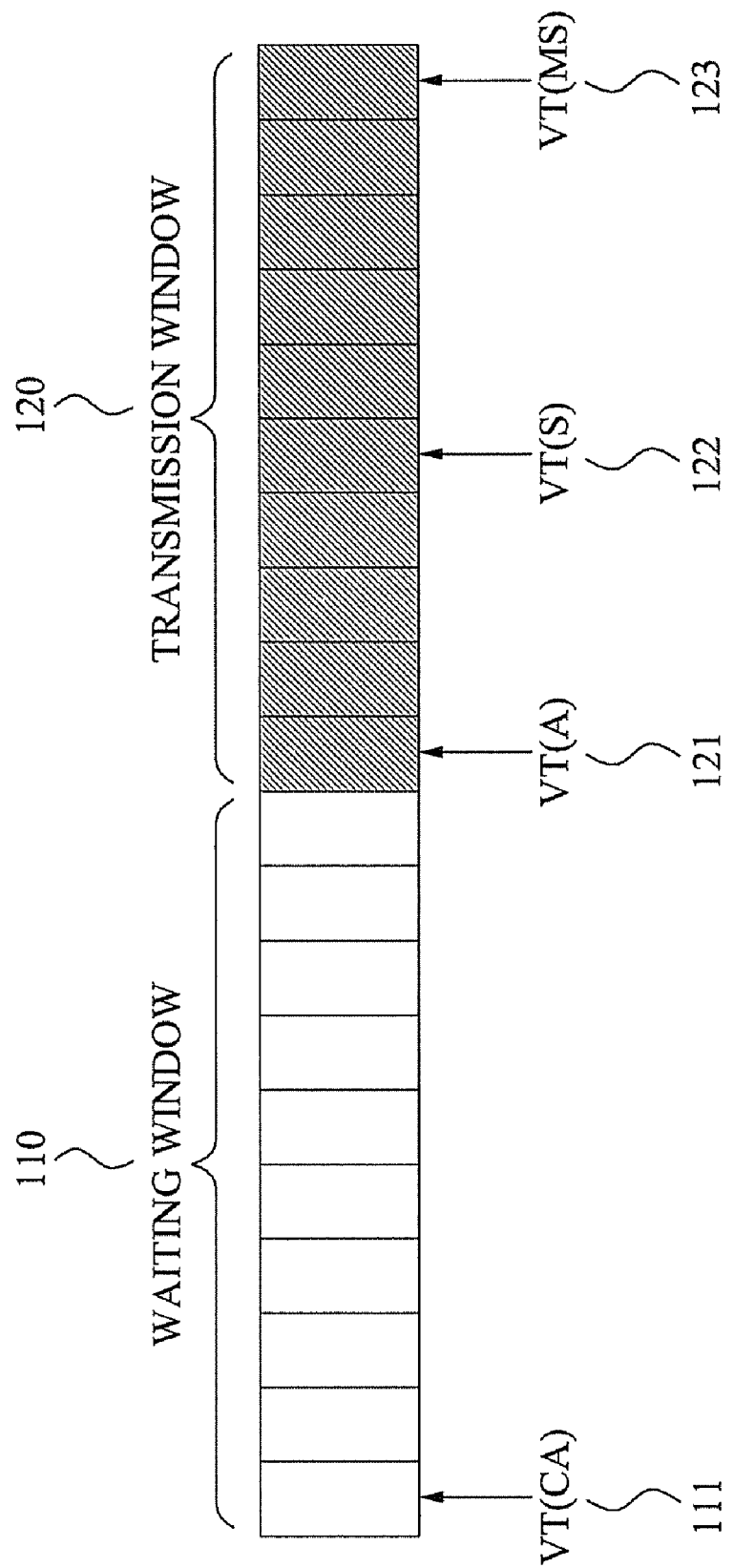
FIG. 1 is a diagram illustrating a window according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Example embodiments described below will be applicable to a system having a long roundtrip delay of a signal, such as a satellite system.

Due to the long roundtrip delay, the system having the long roundtrip delay may receive an NACK with respect to a transmission packet and may also receive a status protocol data unit (PDU) before the packet retransmitted in a hybrid automatic repeat request (HARQ) level is received at a receiving terminal, thereby causing a retransmission of the packet in an automatic repeat request (ARQ) level. Also, when a size of a transmission window is limited, a new packet may not be transmitted until the status PDU is received even though the transmission succeeds through the HARQ.

Accordingly, when the system having the long roundtrip delay operates both the HARQ and ARQ, identical data may be retransmitted in both the HARQ and the ARQ, thereby causing waste of a bandwidth and decreasing a transmission rate.

FIG. 1 is a diagram illustrating a window according to example embodiments. The window according to example embodiments will be described with reference to FIG. 1.

According to example embodiments, a transmission window 120 is operated based on inner feedback information from a layer where the HARQ is performed, and a waiting window 110 is operated based on a status PDU relating to the ARQ.

The HARQ is a combination of a forward error correction (FEC) and the ARQ. The FEC is a technique that helps receiving of correct information by correcting an error occurring in a radio channel using an error correction code, and also the ARQ is a method where a receiving end requests a transmitting end to retransmit a packet when an error occurs in a channel and receives the packet.

Accordingly, the HARQ is a method that prevents an error using the error correction code, and retransmits the packet via the ARQ when the error is not corrected by the error correction code.

In general, the HARQ is performed in a lower layer of a layer where a conventional ARQ is performed, and thus, error is corrected by the ARQ when the error is not corrected by the HARQ.

The HARQ uses a stop-and-wait scheme as a retransmission scheme to reduce complexity, whereas the ARQ uses a selective repeat scheme as a retransmission scheme.

The ARQ used in a $3^{rd}$ generation partnership project (3GPP) long term evolution (LTE) system performs retransmission based on the transmission window and a receiving window. The transmission window controls an operation based on a VT(A) value, a VT(S) value, and a VT(MS) value, and the receiving window controls an operation based on a VR(R) value, a VR(H) value, and a VR(MR) value. The variables for the transmission window and the receiving window are defined as follow.

The VT(A) has a sequence number (SN) value of a subsequent data packet for which an ACK is to be received and is provided to the transmission window, as a lower value.

The VT(S) has an SN value to be assigned to a newly generated and transmitted data packet. An initial value of the VT(S) is set to zero, and the VT(S) is updated whenever an AMD PDU having SN=VT(S) is transferred.

VT(MS) is identical to VT(A)+a size of the transmission window (AM_Window_Size), and is provided to the transmission window, as an upper value.

VR(R) has an SN value of a sequentially and completely received last data packet, and is used as a lower value of the receiving window.

VR(H) has a greatest SN value from among SN values of received data packets.

VR(MR) has a value identical to VR(R)+the size of the transmission window (AM_Window_Size), and has an SN value of a first data packet size of which exceeds a size of the receiving window.

As described above, each of the HARQ and the ARQ independently performs an assigned task in a corresponding layer, and an interacting method between the HARQ and the ARQ is a method of improving a transmission efficiency by interacting between an HARQ operation performed in an MAC layer or a physical layer and an ARQ operation performed in a radio link control (RLC) layer.

Basically, the method reports feedback information received from the HARQ to the ARQ layer to enable the ARQ to perform prompt retransmission and to cope with an HARQ feedback error.

Accordingly, the transmission efficiency may be improved using the interacting method between the HARQ and the ARQ, the interacting method according to example embodiments being appropriate to a system having a long roundtrip delay, As described with reference to FIG. 1, the transmission window 120 is basically operated according to the HARQ feedback information and the waiting window 110 is operated according to the status PDU.

The transmission window 120 is operated based on the VT(A) 121, VT(S) 122, and VT(MS) 123 of the RLC transmission window 120 of the 3GPP LTE, and the waiting window is operated based on the VT(CA) 111.

The transmission window 120 is operated in the manner described above, and only an operation scheme of the VT(A) is corrected according to the HARQ feedback information. In general, the VT(A) is updated based on a received positive acknowledgment signal, namely ACK of the status PDU. However, according to example embodiments, it is defined that the VT(A) is updated based on inner feedback information with respect to reception of ACK.

Also, the VT(CA) of the waiting window 110 is defined to be updated based on an ACK with respect to the status PDU. In a case of separately managing the transmission window 120 and the waiting window 110, the transmission window 120 is operated according to inner ACK information from the HARQ, thereby promptly transmitting a subsequent PDU, and also it is recognized that the HARQ is being retransmitted, when a packet that receives a reception negative acknowledgment signal, namely NACK, from the status PDU does not exist in the waiting window 110, thereby preventing unnecessary retransmission.

The VT(CA) has the SN value of a subsequent data packet for which an ACK is to be received via the status PDU according to a sequence, and is provided to the waiting window 110, as a lower value. The size of the waiting window may be determined to be appropriate for the system by a system designer.

Figure 2:
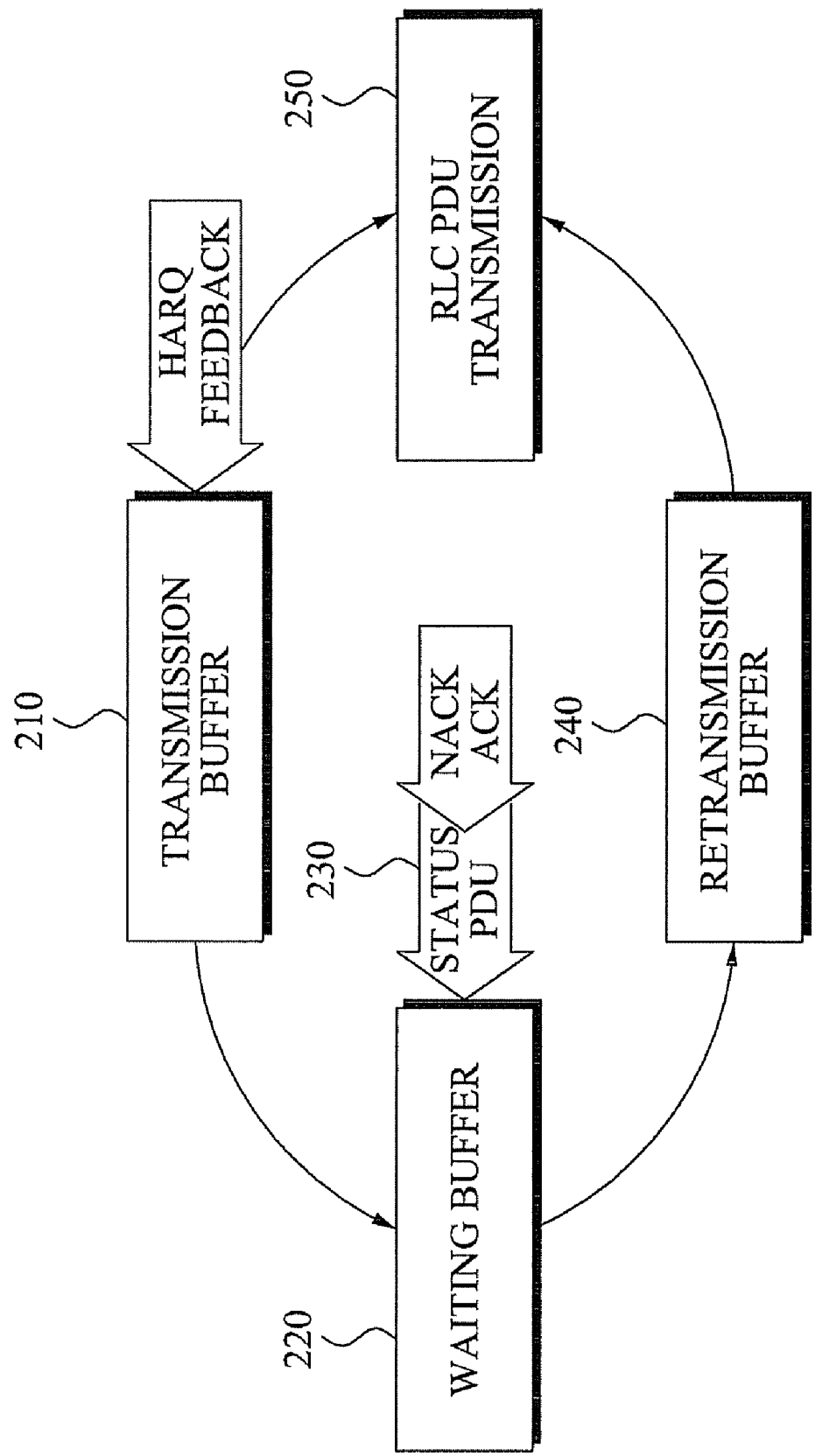
FIG. 2 illustrates a logical configuration of a transmission buffer of a radio link control (RLC) operated using two windows according to example embodiments.

FIG. 2 illustrates a logical configuration of a transmission buffer of a radio link control (RLC) operated using two windows according to example embodiments.

A buffer according to example embodiments includes a transmission buffer 210, a retransmission buffer 240, and a waiting buffer 220 for a waiting window.

Also, the transmission buffer 210 and a transmission window 120 are affected by HARQ feedback information, and the waiting buffer 220 and the waiting window 110 are affected by status PDU 230.

Also, when an error where an NACK is inadvertently recognized as an ACK is sensed in an HARQ entity, the waiting buffer 220 receives feedback information thereof, and performs retransmission of a packet existing in the waiting buffer.

When a transmitting unit incorrectly recognizes the NACK transmitted from a receiving unit as an ACK, it is regarded as a successful transmission and a subsequent transmission is performed. Accordingly, in this instance, the receiving unit informs the transmitting unit of the error where the NACK is incorrectly recognized as the ACK, thereby enabling the transmitting unit to perform retransmission of the corresponding packet where the error occurs.

Figure 3:
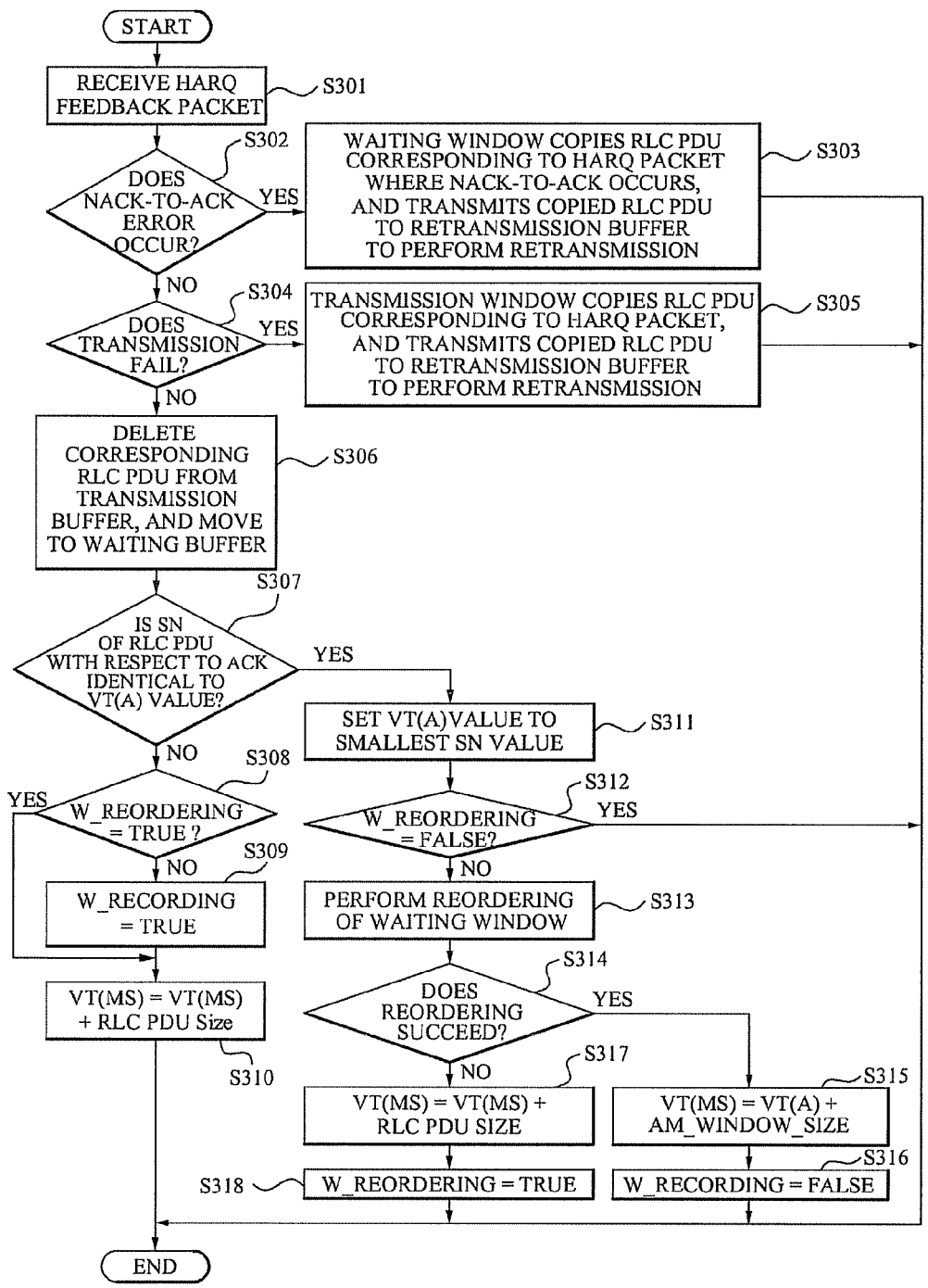
FIG. 3 is a flowchart illustrating an operational flow of a terminal that receives HARQ feedback information according to example embodiments.

FIG. 3 is a flowchart illustrating an operational flow of a terminal that receives HARQ feedback information according to example embodiments.

A transmitting unit receives an HARQ feedback packet in operation S301, and determined whether an error where an NACK is incorrectly recognized as an ACK, occurs in operation S302.

As a result of the determination, when the error where the NACK is recognized as the ACK (hereinafter, NACK-to-ACK error) occurs, the transmitting unit copies, from a waiting window, a packet (RLC PDU) corresponding to an HARQ packet where NACK-to-ACK error occurs, transmits the copied packet to a retransmission buffer to perform retransmission, and finishes the operational flow of the transmitting unit after operation S303.

As the result of the determination, when the NACK-to-ACK error does not occur, it is determined whether packet transmission succeeds or fails in operation 5304. When the packet transmission fails, the transmitting unit copies, from a transmission window, (a packet (RLC PDU) corresponding to an HARQ packet, transmits the copied packet to the retransmission buffer to perform retransmission, and finishes the operational flow of the transmitting unit after operation S305.

Also, when the packet transmission succeeds, the corresponding packet (RLC PDU) is deleted from the transmission buffer, and the packet is moved to the waiting buffer in operation S306.

Subsequently, the VT(MS) is updated to obtain a transmission capacity. Hereinafter, updating method will be described in detail.

The transmitting unit determines whether an SN of the packet (RLC PDU) with respect to the ACK is identical to the VT(A) value in operation S307.

As a result of determination, when the SN of the packet (RLC PDU) with respect to the ACK is not identical to the VT(A) value, whether a w_reordering variable has a true value is determined in operation S308, and when the w_reordering variable does not have the true value, the w_reordering variable is set to the true value in operation S309.

In this instance, the w_reordering variable indicates whether a reordering operation of the waiting window is required, and when the w_reordering variable has the true value, the reordering operation needs to be operated, and when the w_reordering variable has a false value, the reordering operation is not required.

When the w_reordering variable has the true value, the VT(MS) is set to be VT(MS)+a size of the packet (RLC PDU) and the operational flow of the transmitting unit is finished after operation S310.

When the SN of the packet (RLC PDU) with respect to the ACK is identical to the VT(A) value, the VT(A) value is set to a smallest SN value from among SN values of packets that fail to receive an ACK from the transmission window in operation S311.

Subsequently, the transmitting unit determines whether the w_reordering variable has the false value in operation 5312, and when the w_reordering variable has the false value, the operational flow of the transmitting unit is finished, and when w_reordering variable does not have the false value, a reordering operation with respect to RLC PDUs packets existing in the waiting window is performed in operation 5313.

In this instance, the reordering operation is an operation that all the packets (RLC PDUs) are thoroughly arranged according to their SNs.

The transmitting unit determines whether the reordering operation succeeds in operation S314, and when the reordering operation succeeds, the VT(MS) value is set to VT(A)+a size of the transmission window in operation S315. Subsequently, the w_reordering variable is set to false in operation 5316.

Conversely, when the reordering operation fails, the VT(MS) value is set to VT(MS)+a size of the packet (RLC PDU) in operation S317.

Subsequently, the terminal sets the w_reordering variable to true and finishes the operational flow of the transmitting unit after operation 318.

Figure 4:
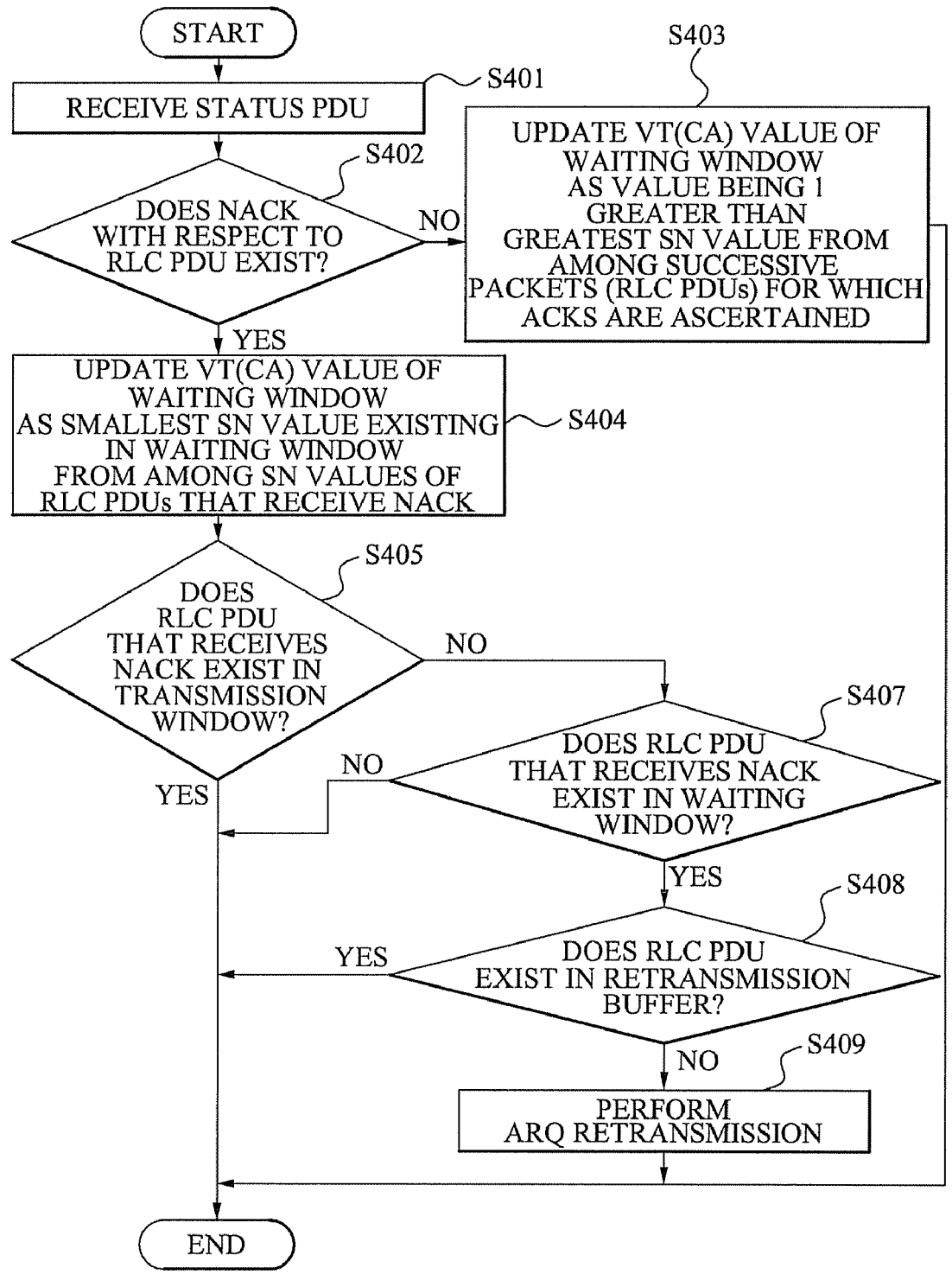
FIG. 4 is a flowchart illustrating an operational flow of a terminal that receives a status protocol data unit (PDU) according to example embodiments.

FIG. 4 is a flowchart illustrating an operational flow of a terminal that receives a status PDU according to example embodiments.

A transmitting unit receives a status PDU in operation 5410.

The transmitting unit determines that whether an NACK with respect to a packet (RLC PDU) exists, and when the NACK with respect to the packet (RLC PDU) does not exist, the transmitting unit updates a VT(CA) value of a waiting window as a value being one greater than a greatest SN value from among successive packets (RLC PDUs) whose ACKs are ascertained and finishes the operational flow of the transmitting unit after operation S403.

As the result of the determination of whether the NACK with respect to the packet (RLC PDU) exists, when the NACK with respect to the packet (RLC PDU) exists, the transmitting unit updates the VT(CA) value of the waiting window as a smallest SN value existing in the waiting window from among SN values of the packets (RLC RDUs) that receive the NACK in operation S404.

Subsequently, the transmitting unit determines whether the packet (RLC PDU) with respect to the NACK exists in the transmission window in operation S405.

As a result of the determination, when the packet (RLC PDU) with respect to the NACK exists in the transmission window, the transmitting unit does not perform an RLC layer ARQ retransmission and finishes the operational flow of the transmitting unit.

Also as a result of the determination, when the packet (RLC PDU) with respect to the NACK does not exist in the transmission window, the transmitting unit determines whether the packet (RLC PDU) that receives the NACK exists in the waiting window in operation S407.

As a result of the determination, when the packet that receives the NACK does not exist in the waiting window, the transmitting unit does not perform the RLC layer ARQ retransmission and finishes the operational flow of the terminal.

Also, as the result of the determination, when the packet (RLC PDU) that receives the NACK exists in the waiting window, whether the corresponding packet exists in a retransmission buffer is determined in operation S408. Also, when the corresponding packet (RLC PDU) exists in the retransmission buffer, the RLC layer ARQ retransmission is not performed and the operational flow of the transmitting unit is finished.

Conversely, when the corresponding packet (RLC PDU) does not exist in the retransmission buffer, ARQ retransmission is performed in operation S409.

Figure 5:
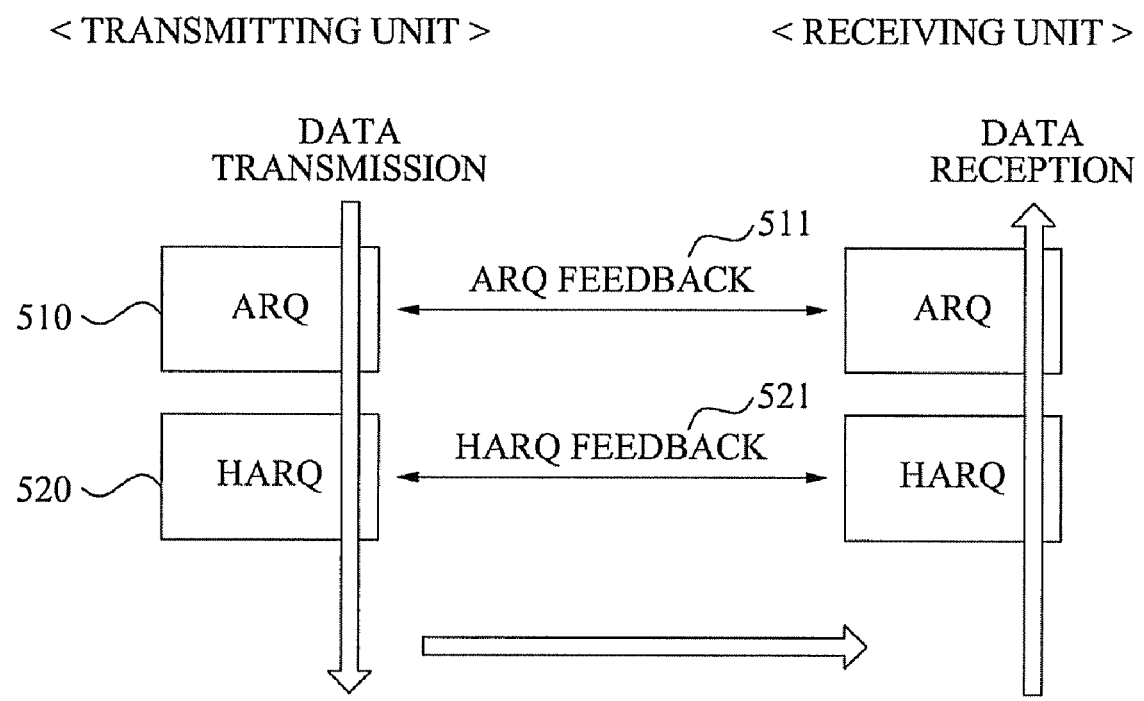
FIG. 5 is a diagram illustrating a method of supporting ARQ and HARQ according to example embodiments.

FIG. 5 is a diagram illustrating a method of supporting ARQ and HARQ according to example embodiments.

Conventionally, an ARQ that is a retransmission method for error correction, is performed in a second layer (layer 2) that is an RLC layer.

According to example embodiments, the ARQ and HARQ are used together.

That is, to transmit a packet in the RLC layer (second layer) where the ARQ 510 is performed, the packet is transmitted to an MAC layer (first layer) where the HARQ is managed, and the packet is transferred via a physical layer in the MAC layer.

The MAC layer is informed of whether the packet transmission in the physical layer succeeds or fails through an HARQ feedback 521, and when the packet transmission fails, the MAC layer commands retransmission.

Also, when the packet transmission fails even after performing the retransmission a maximum number of times defined in the HARQ 520, the MAC layer no longer tries to perform retransmission and deletes the corresponding packet.

In this instance, when the RLC layer recognizes that a packet to be transmitted, according to a command, is not yet transmitted, based on an inner feedback with respect to the HARQ transmission failure or an ARQ feedback (status PDU) 511, the RLC layer gives a command for a retransmission, and the MAC layer newly performs packet transmission via the HARQ 520.

Figure 6:
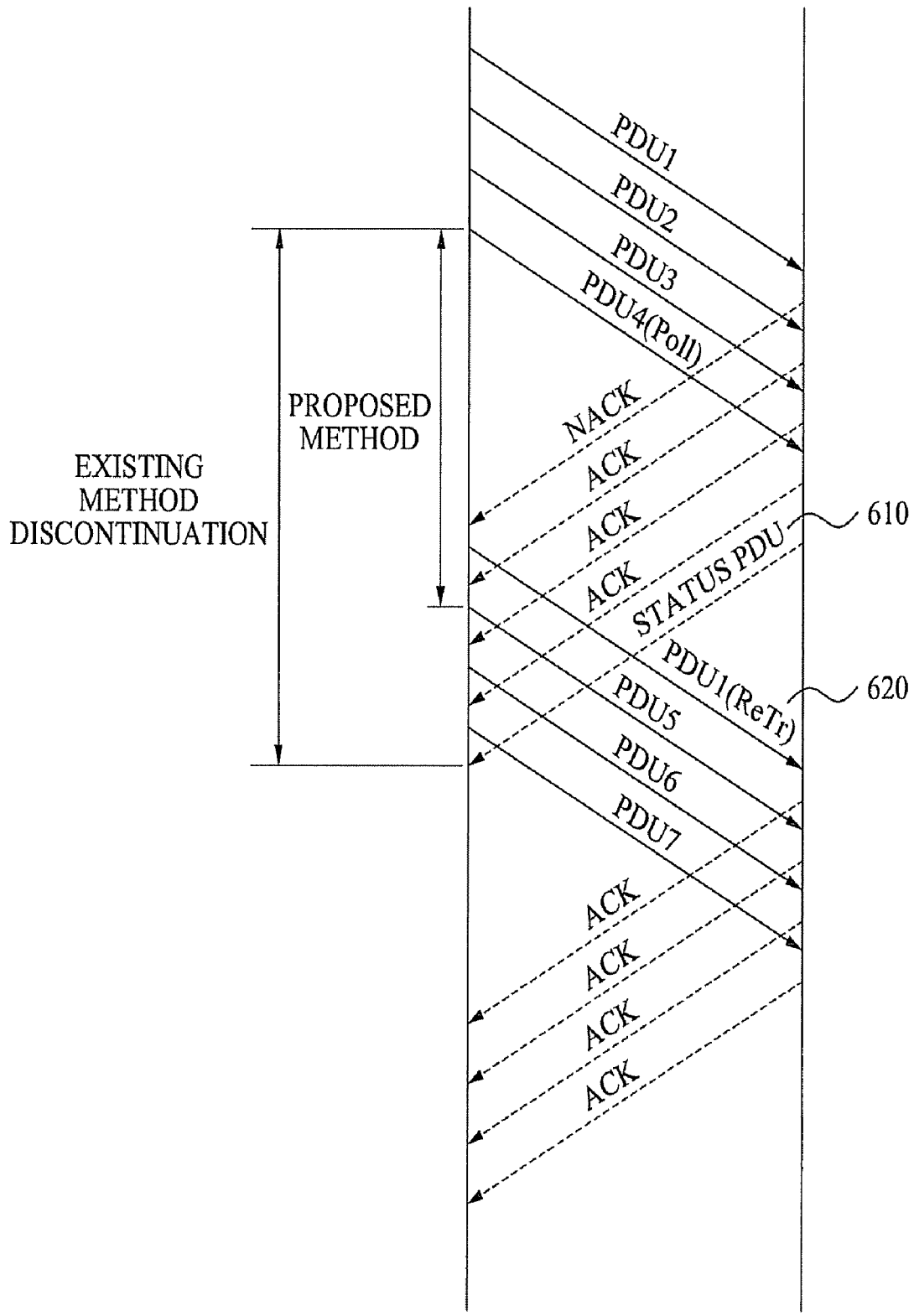
FIG. 6 is a flowchart illustrating a method of supporting ARQ and HARQ according to example embodiments.

FIG. 6 is a flowchart illustrating a method of supporting ARQ and HARQ according to example embodiments.

According to example embodiments, as illustrated in FIG. 5, a new packet (RLC PDU) 620 may be transmitted using HARQ feedback information 610.

Also, HARQ retransmission and ARQ retransmission are prevented from being redundantly performed, and conventional error correction performed in two stages, namely the HARQ and ARQ, is also maintained.

In addition, the waiting window waits for a feedback of a RLC level after the HARQ feedback, and thus, an action may be performed in response to an error where an NACK of the HARQ feedback is incorrectly recognized as an ACK.

Although a few example embodiments have been shown and described, it would be appreciated by those skilled in the art that changes may be made in these example embodiments without departing from the principles and spirit of the invention, the scope of which is defined in the claims and their equivalents.

Example embodiments may provide a method of operating a transmission window for automatic repeat request (ARQ) using inner feedback information from a hybrid automatic repeat request (HARQ), and operating a waiting window using an ARQ status information, thereby solving a problem of the transmission window that cannot promptly move due to a long roundtrip delay.

What is claimed is:

1. A method of interacting between an automatic repeat request (ARQ) and a hybrid automatic repeat request (HARQ) in a system with a long roundtrip delay, the method comprising:

determining, by a first layer unit, whether a packet transmission of a packet succeeds or fails, using first feedback information received in response to the packet transmission;

transferring, by a second layer unit, a packet from a transmission window to a waiting window, when the first layer unit determines that the packet transmission of the packet succeeds;

transferring, by the second layer unit, the packet from the transmission window to a retransmission buffer to retransmit the packet, when the first layer unit determines that the packet transmission of the packet fails; and receiving, by the second layer unit, second feedback information including the retransmitted packet, and determining a process of the retransmitted packet based on the second feedback information, wherein the first layer unit performs the HARQ and the second layer unit performs the ARQ.

2. The method of claim 1, wherein the transferring of the packet when the first layer unit determines that the packet transmission of the packet succeeds further comprises:

adjusting, by the second layer unit, a size of the transmission window using the feedback information of the first layer unit, to perform an additional transmission.

3. The method of claim 2, wherein the adjusting of the size of the transmission window comprises:

increasing a maximum send state variable relating to the transmission window of the second layer unit to be the size of the packet, when a sequence number of the packet is not identical to a sequence number of the packet to be currently received;

reordering the waiting window after determining reordering of the waiting window is required, when the sequence number of the packet is identical to the sequence number of the packet to be received; and restoring the maximum send state variable to an initial value, when the restoring is successfully completed, and increasing the maximum send state variable by the size of the packet, when the reordering is not successfully completed.

4. The method of claim 1, further comprising:

retransmitting the packet, when an error where failure of the packet transmission (NACK) is recognized as success of the packet transmission (ACK), occurs.

5. The method of claim 4, wherein the retransmitting of the packet comprises:

receiving the first feedback information including information relating to retransmission of the packet or the second feedback information including information relating to retransmission of the packet, when the error where the NACK is recognized as the ACK, occurs;

transferring, by the waiting window, the packet to the retransmission buffer based on the first feedback and the second feedback; and retransmitting, by the retransmission buffer, the packet.

6. The method of claim 1, wherein the first layer unit is a media access control (MAC) layer that performs the HARQ.

7. The method of claim 1, wherein the second layer unit is a radio link control (RLC) layer that performs the ARQ.

8. The method of claim 1, wherein the first feedback information is feedback information relating to the HARQ.

9. The method of claim 1, wherein the second feedback information is feedback information relating to the ARQ.

10. The method of claim 1, wherein the receiving of the second feedback information and the determining of the process of the packet comprises:

deleting the packet, when the packet transmission succeeds as a result of analysis of the second feedback information;

not performing retransmission of the packet when the first layer unit is performing retransmission of the packet, when the packet transmission fails and when the packet exists in the transmission window as a result of the second feedback information; and performing retransmission of the packet when the first layer unit is not performing retransmission of the packet, when the packet transmission fails, and when the packet exists in the waiting window as a result of the second feedback information.

* * * * *